US005804667A

United States Patent [19]
Diana et al.

[11] Patent Number: 5,804,667
[45] Date of Patent: Sep. 8, 1998

[54] DISPERSANT ADDITIVES AND PROCESS

[75] Inventors: William B. Diana, Belle Mead; Joseph V. Cusumano, Watchung; Keith R. Gorda, Little York, all of N.J.; Jacob Emert, Brooklyn, N.Y.; William B. Eckstrom, Fanwood, N.J.; David C. Dankworth, Whitehouse Station, N.J.; Jon E. Stanat, Westfield, N.J.; James P. Stokes, Warren, N.J.

[73] Assignee: Exxon Chemical Patents Inc., Linden, N.J.

[21] Appl. No.: 968,230

[22] Filed: Nov. 12, 1997

Related U.S. Application Data

[60] Division of Ser. No. 579,317, Dec. 27, 1995, abandoned, which is a continuation-in-part of Ser. No. 261,557, Jun. 17, 1994.

[51] Int. Cl.⁶ .................................................. C08F 8/00
[52] U.S. Cl. .................................. 525/327.9; 525/333.7; 525/343; 525/38 A; 525/382
[58] Field of Search ..................................... 515/381, 382, 515/327.9, 333.7, 343

[56] References Cited

U.S. PATENT DOCUMENTS

| | | | |
|---|---|---|---|
| 2,831,877 | 4/1958 | Koch | 260/413 |
| 3,172,892 | 3/1965 | Le Suer et al. | 260/326.5 |
| 3,219,666 | 11/1965 | Norman et al. | 260/268 |
| 3,349,107 | 10/1967 | Pawlenko | 260/410.9 |
| 3,539,654 | 11/1970 | Pautrat et al. | 260/768 |
| 3,711,406 | 1/1973 | Lowe | 252/33.4 |
| 3,715,313 | 2/1973 | Haseltine et al. | 252/52 |
| 4,088,588 | 5/1978 | Pecoraro | 252/51.5 |
| 4,108,945 | 8/1978 | Fetters et al. | 260/880 B |
| 4,234,435 | 11/1980 | Meinhardt et al. | 252/51.5 A |
| 4,665,208 | 5/1987 | Welborn, Jr. et al. | 556/179 |
| 4,668,834 | 5/1987 | Rim et al. | 585/12 |
| 4,871,705 | 10/1989 | Hoel | 502/117 |
| 4,927,892 | 5/1990 | Drent et al. | 525/332.9 |
| 4,937,299 | 6/1990 | Ewen et al. | 526/119 |
| 4,952,739 | 8/1990 | Chen | 585/511 |
| 4,970,266 | 11/1990 | Drent et al. | 525/340 |
| 5,017,299 | 5/1991 | Gutierrez et al. | 252/51.5 |
| 5,017,714 | 5/1991 | Welborn, Jr. | 556/12 |
| 5,049,294 | 9/1991 | Zon et al. | 252/51.5 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,070,131 | 12/1991 | Rhodes et al. | 524/484 |
| 5,084,534 | 1/1992 | Welborn et al. | 526/160 |
| 5,096,867 | 3/1992 | Canich | 502/103 |
| 5,120,867 | 6/1992 | Welborn, Jr. | 556/12 |
| 5,153,157 | 10/1992 | Hlatky et al. | 502/117 |
| 5,198,401 | 3/1993 | Turner et al. | 502/155 |
| 5,227,440 | 7/1993 | Canich et al. | 526/129 |
| 5,229,022 | 7/1993 | Song et al. | 252/56 R |
| 5,241,025 | 8/1993 | Hlatky et al. | 526/129 |
| 5,342,979 | 8/1994 | Mueller et al. | 554/206 |
| 5,345,002 | 9/1994 | Song et al. | 568/793 |

FOREIGN PATENT DOCUMENTS

| | | |
|---|---|---|
| 1 143 720 | 3/1983 | Canada . |
| 0 148 592 A2 | 7/1985 | European Pat. Off. . |
| 0 277 003 A1 | 8/1988 | European Pat. Off. . |
| 0 277 004 A1 | 8/1988 | European Pat. Off. . |
| 0 129 368 B1 | 7/1989 | European Pat. Off. . |
| 0 420 436 A1 | 4/1991 | European Pat. Off. . |
| 0 440 913 A2 | 8/1991 | European Pat. Off. . |
| 0 520 732 A1 | 12/1992 | European Pat. Off. . |
| 55-55138 | 4/1980 | Japan . |
| 62-33132 | 2/1987 | Japan . |
| WO91/04257 | 4/1991 | WIPO . |
| WO92/00333 | 1/1992 | WIPO . |
| WO93/08199 | 4/1993 | WIPO . |
| WO93/08221 | 4/1993 | WIPO . |
| WO94/13709 | 6/1994 | WIPO . |
| WO95/35326 | 12/1995 | WIPO . |
| WO95/35329 | 12/1995 | WIPO . |
| WO95/35330 | 12/1995 | WIPO . |

OTHER PUBLICATIONS

N. Bahrmann, Chapter 5, Koch Reactions, "New Synthesis with Carbon Monoxide", J. Falbe, Springer–Verlag, New York, 1970.

*Primary Examiner*—Bernard Lipman
*Attorney, Agent, or Firm*—Ohlandt, Greeley, Ruggiero & Perle

[57] ABSTRACT

The invention pertains to improved lubricating oil dispersants wherein a fractionating polymer is prepared prior to functionalization (e.g., in the Koch reaction) for making dispersant additives. In one aspect, it was discovered that by fractionating a polymer to remove light hydrocarbon and unreacted monomer from the polymer before the carbonylation step of the Koch reaction, the amount of light ester impurities generated was minimized. Light ester is an undesirable byproduct that adversely affects the recycle of the catalyst from the functionalization step of the Koch reaction. The invention also pertains to improved lubricating oil nitrogen-containing dispersant additives derived from fractionated polymer.

10 Claims, No Drawings

DISPERSANT ADDITIVES AND PROCESS

This is a divisional of application Ser. No. 579,317, filed Dec. 27, 1995 abandoned which is a Continuation-in-part of U.S. Ser. No. 08/261,557, filed Jun. 17, 1994.

The present invention relates to dispersant additives and processes for their preparation, and is particularly directed to an improved dispersant additive obtained via the Koch reaction and a process for preparing the same. The Koch reaction relates to reacting at least one carbon—carbon double bond with carbon monoxide in the presence of an acidic catalyst and a nucleophilic trapping agent to form a carbonyl- or thiocarbonyl-containing functional group, such as a carboxylic acid or a carboxylic ester functional group. Koch-based dispersants include derivatives of the Koch reaction product.

The term "polymer" is used herein to refer to materials comprising large molecules built up by the repetition of small, simple chemical units. In a hydrocarbon polymer those units are predominantly formed of hydrogen and carbon. Polymers are defined by average properties, and in the context of the invention polymers have a number average molecular weight ($\overline{M}_n$) of at least 500. Light polymer used herein refers to polymer having less than 300 molecular weight (e.g., 48 to 288). Deeper cut polymers herein refer to polymers having less than 500 molecular weight (e.g., 48 to 490). The term "raw polymer" is herein intended to refer to polymer as manufactured containing the above described light polymer and deeper cut polymers.

The term "hydrocarbon" is used herein to refer to non polymeric compounds comprising hydrogen and carbon having uniform properties such as molecular weight. However, the term "hydrocarbon" is not intended to exclude mixtures of such compounds which individually are characterized by such uniform properties. Light hydrocarbon as used herein refers to compounds having a carbon number between $C_4$ and $C_{24}$, inclusive.

U.S. Ser. No. Attorney Docket Number PT-1241, filed Nov. 28, 1995, Amidation of Ester Functionalized Polymers, which is a continuation of U.S. Ser. No. 261,507, filed Jun. 17, 1994, abandoned; U.S. Ser. No. 261,559, filed Jun. 17, 1994, Batch Koch Carbonylation Process; U.S. Ser. No. 261,534, filed Jun. 17, 1994, Derivatives of Polyamines With One Primary Amine and Secondary or Tertiary Amines; U.S. Ser. No. 261,560, filed Jun. 17, 1994, Continuous Process for Production of Functionalized Olefins; U.S. Ser. No. 261,554, filed Jun. 17, 1994, Lubricating Oil Dispersants Derived from Heavy Polyamines; and U.S. Ser. No. 261,558, filed Jun. 17, 1994, Functionalized Additives Useful In Two-Cycle Engines, all contain related subject matter as indicated by their titles and are hereby incorporated by reference in their entirety for all purposes.

U.S. Ser. No. 534,891, filed Sep. 25, 1995, which is a continuation of U.S. Ser. No. 992,403, filed Dec. 17, 1992, abandoned, and which is incorporated by reference herein discloses reactions of a polymer having at least one ethylenic double bond reacted via a Koch mechanism to form carbonyl or thio carbonyl group-containing compounds which may subsequently be derivatized. The polymers react with carbon monoxide in the presence of an acid catalyst or a catalyst preferably complexed with the nucleophilic trapping agent. A preferred catalyst is $BF_3$ and preferred catalyst complexes include $BF_3 \cdot H_2O$ and $BF_3$ complexed with halo-substituted phenols. The starting polymer reacts with carbon monoxide at point of unsaturation to form either iso- or neo-acyl groups with the nucleophilic trapping agent, e.g., with water, alcohol (preferably a substituted phenol) or thiol to form respectively a carboxylic acid, carboxylic ester group, or thio ester.

The functionalized polymer can be subsequently derivatized with inter alia an amine, alcohol, amino alcohol, etc. to form a dispersant additive for lubricant applications.

The present invention relates to fractionating (e.g., stripping) raw polymer to remove at least the light polymers or alternatively light hydrocarbon from the raw polymer prior to the reaction described above. The removal of the light polymer fraction results in a surprising reduction in the amount of heretofore unwanted byproducts, such as light polymer esters formed during the Koch reaction. The removal of the deeper cut polymer fraction results in a fractionated polymer which allows a lubricating oil additive to be made of surprisingly improved dispersant properties.

The presence of light polymer ester can adversely affect the performance of the final dispersant product. Furthermore, nitrogen-containing derivatives (e.g., amine derivatives) of the Koch functionalized polymers formed from the fractionated polymer exhibit unexpectedly improved dispersancy. Hence, it is desirable to eliminate or minimize the content of light polymer present in the Koch reaction.

The presence of light functionalized polymer (e.g., polymer ester) has a second deleterious effect on the process described above. In one embodiment of the process, the functionalized fractionated polymer must be treated prior to the derivatization step. The crude ester produced in the carbonylation contains inter alia the functionalized fractionated polymer, impurities, and in the case of the use of the preferred nucleophilic trapping agent, unreacted halophenol (e.g., 2,4-dichlorophenol). Using, for example, evaporation, the functionalized fractionated polymer is further treated to remove the unreacted halophenol. The distillate is collected and fractionally distilled to recover and recycle the unreacted halophenol. However, some of the impurities, especially the light polymer esters that boil close to halophenol as well as light halogenated compounds are also inadvertently recycled. In a continuous process, such as in a commercial facility, the recycle stream of desired unreacted halophenol will be quickly saturated with the undesirable components, such as the light esters.

Since the evaporation is a single stage operation, an equilibrium level of undesirable components (e.g., light esters) will build up in the process stream. In order to maintain low impurity levels the distillate may have to be purged (e.g., discarded). This is very costly from the standpoint of the loss of valuable chemicals but also from an environmental standpoint. Thus, it is very desirable to minimize the amount of light ester present in the crude ester fed to the evaporators. This is accomplished by minimizing the introduction of light ester precursors such as $C_4$ to $C_{24}$ olefins in the fractionated polymer feed to the functionalization process.

BACKGROUND OF THE INVENTION

Both hydrocarbon compounds, as well as polymeric compounds, have been reacted to form carboxyl group-containing compounds and their derivatives.

Carboxyl groups have the general formula —CO—OR, where R can be H, a hydrocarbyl group, or a substituted hydrocarbyl group.

The synthesis of carboxyl group-containing compounds from olefinic hydrocarbon compounds, carbon monoxide, and water in the presence of metal carboxyls is disclosed in references such as N. Bahrmann, Chapter 5, Koch Reactions, "New Synthesis with Carbon Monoxide" J.

Falbe; Springer-Verlag, New York, 1980. Hydrocarbons having olefinic double bonds react in two steps to form carboxylic acid-containing compounds. In the first step an olefin compound reacts with an acid catalyst and carbon monoxide in the absence of water. This is followed by a second step in which the intermediate formed during the first step undergoes hydrolysis or alcoholysis to form a carboxylic acid or ester. An advantage of the Koch reaction is that it can occur at moderate temperatures of −20° C. to +80° C., and pressures up to 100 bar.

The Koch reaction can occur at double bonds where at least one carbon of the double bond is di-substituted to form a "neo" acid or ester

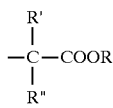

(where R'and R"are not hydrogen).

The Koch reaction can also occur when both carbons are mono-substituted or one is monosubstituted and one is unsubstituted to form an "iso" acid (i.e. —R'HC—COOR). Bahrmann et al. discloses isobutylene converted to isobutyric acid via a Koch-type reaction.

U.S. Pat. No. 2,831,877 discloses a multi-phase, acid catalyzed, two-step process for the carboxylation of olefins with carbon monoxide.

Complexes of mineral acids in water with $BF_3$ have been studied to carboxylate olefins. U.S. Pat. No. 3,349,107 discloses processes which use less than a stoichiometric amount of acid as a catalyst. Examples of such complexes are $H_2O.BF_3.H_2O$, $H_3PO_4.BF_3.H_2O$ and $HF.BF_3.H_2O$.

EP-A-0148592 relates to the production of carboxylic acid esters and/or carboxylic acids by catalyzed reaction of a polymer having carbon—carbon double bonds, carbon monoxide and either water or an alcohol, optionally in the presence of oxygen. The catalysts are metals such as palladium, rhodium, ruthenium, iridium, and cobalt in combination with a copper compound, in the presence of a protonic acid such as hydrochloric acid. A preferred polymer is polyisobutene, which may have at least 80% of its carbon—carbon double bonds in the form of terminal double bonds. Liquid polyisobutene having a number average molecular weight in the range of from 200 to 2,500, preferably up to 1,000 are described.

U.S. Pat. No. 4,927,892 relates to reacting a polymer or copolymer of a conjugated diene, at least part of which is formed by 1,2 polymerization, with carbon monoxide and water and/or alcohol in the presence of a catalyst prepared by combining a palladium compound, certain ligands and/or acid except hydrohalogenic acids having a pKa of less than 2. Useful Lewis acids include $BF_3$.

Although there are disclosures in the art of olefinic hydrocarbons functionalized at the carbon—carbon double bond to form a carboxylic acid or derivative thereof via Koch-type chemistry, there is no disclosure that polymers containing carbon—carbon double bonds, including terminal olefinic bonds, either secondary or tertiary type olefinic bonds, could be successfully reacted via the Koch mechanism. The Koch process is particularly useful to make neo acid and neo ester functionalized polymer. The present invention is useful to improve the Koch process. Known catalysts used to carboxylate low molecular weight olefinic hydrocarbons by the Koch mechanism were found to be unsuitable for use with polymeric material. Specific catalysts have been found which can result in the formation of a carboxylic acid or ester at a carbon—carbon double bond of a polymer. Koch chemistry affords the advantage of the use of moderate temperatures and pressures, by using highly acidic catalysts and/or careful control of concentrations.

SUMMARY OF THE INVENTION

In one aspect, the present invention is a process for improving a polymer used in the Koch reaction for making dispersant additives comprising: fractionating a polymer to remove a light hydrocarbon fraction prior to the carbonylation step. The present invention is also a functionalized, fractionated hydrocarbon polymer wherein the fractionated polymer backbone has $\overline{M}_n \geq 500$, functionalization is by groups of the formula —CO—Y—$R^3$ wherein Y is O or S, and $R^3$ is H, hydrocarbyl, substituted hydrocarbyl, aryl, or substituted aryl, and wherein, optionally, at least 50 mole % of the functional groups are attached to a tertiary carbon atom of the fractionated polymer backbone, the fractionated polymer prepared by fractionating a raw hydrocarbon polymer to remove a light hydrocarbon fraction from said raw hydrocarbon polymer prior to functionalization. The present invention is also a functionalized hydrocarbon polymer wherein the polymer backbone has $\overline{M}_n \geq 500$, the polymer backbone prior to functionalization containing less than about 1 weight percent hydrocarbon of carbon number $C_{24}$ and below, functionalization is by attachment of groups of the formula —CO—Y—$R^3$ wherein Y is O or S, and $R^3$ is H, hydrocarbyl, substituted hydrocarbyl, aryl, or substituted aryl, and wherein, optionally, at least 50 mole % of the functional groups are attached to a tertiary carbon atom of the polymer backbone.

The present invention relates to an improved process for functionalization of fractionated hydrocarbon polymer wherein the fractionated polymer backbone has $\overline{M}_n \geq 500$ and light polymer (e.g., less than 300 molecular weight) has been removed prior to functionalization and the functionalization is by groups of the formula:

—CO—Y—$R^3$ wherein Y is O or S, and either $R^3$ is (i) H, hydrocarbyl and at least 50 mole % of the functional groups are attached to a tertiary carbon atom of the polymer backbone or (ii) $R^3$ is aryl, substituted aryl or substituted hydrocarbyl and, optionally, at least 50 mole % of the functional groups are attached to a tertiary carbon atom of the polymer backbone.

Thus the functionalized fractionated polymer may be depicted by the formula:

POLY—$(CR^1R^2$—CO—Y—$R^3)_n$         (I)

wherein POLY is a fractionated hydrocarbon polymer backbone having a number average molecular weight of at least 500, n is a number greater than 0, $R^1$, $R^2$ and $R^3$ may be the same or different and are each H or hydrocarbyl with the optional provisos that either (1) $R^1$ and $R^2$ are selected such that at least 50 mole percent of the —$CR^1R^2$ groups wherein both $R^1$ and $R^2$ are not H, or (2) when $R^3$ is aryl, substituted aryl or substituted hydrocarbyl, $R^1$ and $R^2$ are selected such that at least 50 mole percent of the —$CR^1R^2$ groups wherein both $R^1$ and $R^2$ are not H.

In another aspect, the present invention relates to a lubricating oil nitrogen-containing dispersant additive exhibiting improved dispersancy comprising a nitrogen-containing polymeric material derived from a fractionated polymer having a $\overline{M}_n$ of from about 700 to 10,000, a $\overline{M}_w/\overline{M}_n$, (molecular weight distribution, MWD) of from about 1.2 to 3 and containing less than about 10 mole % of polymer chains having a molecular weight of less than 500. In one embodiment, the nitrogen-containing polymeric material comprises the reaction product of an amine compound and functionalized, fractionated polymer prepared by functionalizing the fractionated polymer to contain mono- or dicarboxylic acid producing groups. The functionalization is preferably via the Koch reaction as herein described, but can be carried out by any other methods suitable for introducing mono- or dicarboxylic acid producing groups into the fractionated polymer, such as by reacting the fractionated polymer with a carboxylic reactant selected from the group consisting of a monounsaturated monocarboxylic acid producing compound and a monounsaturated dicarboxylic acid producing compound.

In still another aspect, the present invention provides a process for preparing a lubricating oil nitrogen-containing dispersant exhibiting improved dispersancy properties which comprises: (A) functionalizing a fractionated polymer having a $\overline{M}_n$ of from about 700 to 10,000 and a MWD of from about 1.2 to 3 and containing less than about 10 mole % of polymer chains having a molecular weight of less than 500; and (B) reacting said functionalized, fractionated polymer with a nitrogen-containing compound. The functionalizing step preferably comprises carbonylating the fractionated polymer using a Koch reaction, but can be by any suitable method for introducing mono- or dicarboxylic acid producing groups, such as by reacting the fractionated polymer with a carboxylic reactant selected from the group consisting of a monounsaturated monocarboxylic acid producing compound and a monounsaturated dicarboxylic acid producing compound. The functionalization step can also be accomplished by alkylation of a hydroxy aromatic compound (e.g., phenol) with the fractionated polymer; the resulting polymer substituted hydroxy aromatic compound can then be derivatized by reaction with am aldehyde and a reactive nitrogen-containing compound (e.g., an alkylene polyamine) to form a Mannich base dispersant.

As used herein the term "hydrocarbyl" denotes a group having a carbon atom directly attached to the remainder of the molecule and having predominantly hydrocarbon character within the context of this invention and includes polymeric hydrocarbyl radicals. Such radicals include the following:

(1) Hydrocarbon groups; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, the two indicated substituents may together form a cyclic radical). Such radicals are known to those skilled in the art; examples include methyl, ethyl, butyl, hexyl, octyl, decyl, dodecyl, tetradecyl, octadecyl, eicosyl, cyclohexyl, phenyl and naphthyl (all isomers being included). Any hydrocarbyl radical containing aromatic is broadly referred to herein as "aryl".

(2) Substituted hydrocarbon groups; that is, radicals containing non-hydrocarbon substituents which, in the context of this invention, do not alter predominantly hydrocarbon character of the radical. Those skilled in the art will be aware of suitable substituents (e.g., halo, hydroxy, alkoxy, carbalkoxy, nitro, alkylsulfoxy).

(3) Hetero groups; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen particularly non-basic nitrogen which would deactivate the Koch catalyst, oxygen and sulfur.

In general, no more than about three substituents or hetero atoms, and preferably no more than one, will be present for each 10 carbon atoms in the hydrocarbon-based radical. Polymeric hydrocarbyl radicals are those derived from hydrocarbon polymers, which may be substituted and/or contain hetero atoms provided that they remain predominantly hydrocarbon in character.

Conversely, as used herein, the term "substituted hydrocarbyl" denotes a radical having a carbon atom directly attached to the remainder of the molecule, wherein the character of the radical is not exclusively hydrocarbon due to the presence of non-hydrocarbon substituents, such as those noted above in describing "hydrocarbyl", or heteroatom groups in the radical. Any substituted hydrocarbyl radical containing aromatic is broadly referred to herein as "substituted aryl".

The functionalized fractionated polymer may be derived from a hydrocarbon polymer comprising non-aromatic carbon—carbon double bond, also referred to as an olefinically unsaturated bond, or an ethylenic double bond. The polymer is functionalized at that double bond via a Koch reaction to form the carboxylic acid, carboxylic ester or thio acid or thio ester. In one aspect, it is the object of this invention to remove light polymer or light hydrocarbon from the raw polymer prior to the functionalization. In another aspect, it is the object of this invention to remove deeper cut polymer from the raw polymer prior to the functionalization.

While it is also possible to functionalize the raw polymer and to then fractionate the functionalized raw polymer to remove functionalized light polymers or functionalized deeper cut polymers therefrom, this is not preferred as additional manufacturing costs will generally result.

Koch reactions have not heretofore been applied to polymers having number average molecular weights greater than 500. The hydrocarbon polymer preferably has $\overline{M}_n$ greater than 1,000. In the Koch process a polymer having at least one ethylenic double bond is contacted with an acid catalyst and carbon monoxide in the presence of a nucleophilic trapping agent such as water or alcohol. The catalyst is preferably a classical Broensted acid or Lewis acid catalyst. These catalysts are distinguishable from the transition metal catalysts of the type described in the prior art. The Koch reaction, as applied in the process of the present invention, may result in good yields of functionalized polymer, even 90 mole % or greater.

POLY, in general formula I, represents a fractionated hydrocarbon polymer backbone having $\overline{M}_n$ of at least 500 with the polymer less than 300 molecular weight removed, and/or light hydrocarbon of carbon number $C_4$ to $C_{24}$. $\overline{M}_n$ may be determined by available techniques such as gel permeation chromatography (GPC). POLY is derived from unsaturated polymer. Such GPC methods are useful in determining the molecular weight and molecular weight distribution of the raw polymer, the fractionated polymer, the light polymer and the deeper cut polymer.

Polymers

The polymers which are useful in the Koch reaction are polymers containing at least one carbon—carbon double bond (olefinic or ethylenic) unsaturation. Thus, the maximum number of functional groups per polymer chain is limited by the number of double bonds per chain. Such polymers have been found to be receptive to Koch mechanisms to form carboxylic acids or derivatives thereof, using the catalysts and nucleophilic trapping agents of the present invention. It is known that polymers useful in the Koch process include polymers containing a distribution of molecular weights (MWD).

Useful polymers in the Koch reaction include polyalkenes including homopolymer, copolymer (used interchangeably with interpolymer) and mixtures. Homopolymers and interpolymers include those derived from polymerizable olefin monomers of 2 to about 16 carbon atoms; usually 2 to about 6 carbon atoms.

Particular reference is made to the alpha olefin polymers made using organo metallic coordination compounds. A particularly preferred class of polymers are ethylene alpha olefin copolymers such as those disclosed in U.S. Pat. No. 5,017,299. The polymer unsaturation can be terminal, internal or both. Preferred polymers have terminal unsaturation, preferably a high degree of terminal unsaturation. Terminal unsaturation is the unsaturation provided by the last monomer unit located in the polymer. The unsaturation can be located anywhere in this terminal monomer unit. Terminal olefinic groups include vinylidene unsaturation, $R^a R^b C{=}CH^2$; trisubstituted olefin unsaturation, $R^a R^b C{=}CR^c H$; vinyl unsaturation, $R^a HC{=}CH_2$; 1,2-disubstituted terminal unsaturation, $R^a HC{=}CHR^b$; and tetra-substituted terminal unsaturation, $R^a R^b C{=}CR^c CR^d$. At least one of $R^a$ and $R^b$ is a polymeric group of the present invention, and the remaining $R^b$, $R^c$ and $R^d$ are hydrocarbon groups as defined with respect to R, $R^1$, $R^2$, and $R^3$ above.

Low molecular weight polymers, also referred to herein as dispersant range molecular weight polymers, are polymers having $\overline{M}_n$ less than 20,000, preferably 500 to 20,000 (e.g. 1,000 to 20,000), more preferably 1,500 to 10,000 (e.g. 2,000 to 8,000) and most preferably from 1,500 to 5,000. The number average molecular weights are measured by vapor phase osmometry or GPC. Low molecular weight polymers are useful in forming dispersants for lubricant additives. In accordance with this invention, low molecular weight polymers are preferably removed by fractionation (e.g., stripping or distillation) to obtain fractionated polymers having less than 10 mole % of deeper cut polymer chains, as described herein.

Medium molecular weight polymers $\overline{M}_n$'s ranging from 20,000 to 200,000, preferably 25,000 to 100,000; and more preferably, from 25,000 to 80,000 are useful for viscosity index improvers for lubricating oil compositions, adhesive coatings, tackifiers and sealants. The medium $\overline{M}_n$ can be determined by membrane osmometry.

The higher molecular weight materials have $\overline{M}_n$ of greater than about 200,000 and can range to 15,000,000 with specific embodiments of 300,000 to 10,000,000 and more specifically 500,000 to 2,000,000. These polymers are useful in polymeric compositions and blends including elastomeric compositions. Higher molecular weight materials having $\overline{M}_n$'s of from 20,000 to 15,000,000 can be measured by gel permeation chromatography with universal calibration, or by light scattering. The values of the ratio $\overline{M}_w/\overline{M}_n$, referred to as molecular weight distribution (MWD) are not critical. However, a typical minimum $\overline{M}_w/\overline{M}_n$ value of about 1.1–2.0 is preferred with typical ranges of about 1.1 up to about 4.

More preferably, the polymer material used for preparing the nitrogen-containing dispersant additives of this invention having improved dispersancy properties comprises a fractionated polymer having a $\overline{M}_n$ of from about 700 to 10,000, more preferably from about 800 to 5,000, and most preferably from about 1,000 to 4,000 and a MWD of from about 1.2 to 3, most preferably from about 1.2 to 2.5, and containing less than about 10 mole % (preferably less than about 5 mole %, more preferably less than about 3 mole %) of polymer chains having a molecular weight of less than 500. Lubricating oil dispersant additives prepared from such fractionated polymers have been found to exhibit surprisingly improved dispersancy properties in internal combustion engine, crankcase lubricating oil applications.

The olefin monomers are preferably polymerizable terminal olefins; that is, olefins characterized by the presence in their structure of the group —R—C=CH$_2$, where R is H or a hydrocarbon group. However, polymerizable internal olefin monomers (sometimes referred to in the patent literature as medial olefins) characterized by the presence within their structure of the group:

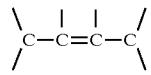

can also be used to form the polyalkenes. When internal olefin monomers are employed, they normally will be employed with terminal olefins to produce polyalkenes which are interpolymers. For this invention, a particular polymerized olefin monomer which can be classified as both a terminal olefin and an internal olefin, will be deemed a terminal olefin. Thus, pentadiene-1,3 (i.e., piperylene) is deemed to be a terminal olefin.

While the polyalkenes generally are hydrocarbon polyalkenes, they can contain substituted hydrocarbon groups such as lower alkoxy, lower alkyl mercapto, hydroxy, mercapto, and carbonyl, provided the non-hydrocarbon moieties do not substantially interfere with the functionalization or derivatization reactions of this invention. When present, such substituted hydrocarbon groups normally will not contribute more than about 10% by weight of the total weight of the polyalkenes. Since the polyalkene can contain such non-hydrocarbon substituent, it is apparent that the olefin monomers from which the polyalkenes are made can also contain such substituents. As used herein, the term "lower" when used with a chemical group such as in "lower alkyl" or "lower alkoxy" is intended to describe groups having up to seven carbon atoms.

The polyalkenes may include aromatic groups and cycloaliphatic groups such as would be obtained from polymerizable cyclic olefins or cycloaliphatic substituted-polymerizable acrylic olefins. There is a general preference for polyalkenes free from aromatic and cycloaliphatic groups (other than the diene styrene interpolymer exception already noted). There is a further preference for polyalkenes derived from homopolymers and interpolymers of terminal hydrocarbon olefins of 2 to 16 carbon atoms. This further preference is qualified by the proviso that, while interpolymers of terminal olefins are usually preferred, interpolymers optionally containing up to about 40% of polymer units derived from internal olefins of up to about 16 carbon atoms are also within a preferred group. A more preferred class of polyalkenes are those selected from the group consisting of homopolymers and interpolymers of terminal olefins of 2 to 6 carbon atoms, more preferably 2 to 4 carbon atoms. However, another preferred class of polyalkenes are the latter, more preferred polyalkenes optionally containing up to about 25% of polymer units derived from internal olefins of up to about 6 carbon atoms.

Specific examples of terminal and internal olefin monomers which can be used to prepare the polyalkenes according to conventional, well-known polymerization techniques include ethylene; propylene; butene-1; butene-2; isobutene; pentene-1; etc.; propylene-tetramer; diisobutylene; isobutylene trimer; butadiene-1,2; butadiene-1,3; pentadiene-1,2; pentadiene-1,3; etc.

Useful polymers include alpha-olefin homopolymers and interpolymers, and ethylene alpha-olefin copolymers and terpolymers. Specific examples of polyalkenes include polypropylenes, polybutenes, ethylene-propylene copolymers, ethylene-butene copolymers, propylene-butene copolymers, styrene-isobutene copolymers, isobutene-butadiene-1,3 copolymers, etc., and terpolymers of isobutene, styrene and piperylene and copolymer of 80% of ethylene and 20% of propylene. A useful source of polyalkenes are the poly(isobutene)s obtained by polymerization of $C_4$ refinery stream having a butene content of about 35 to about 75% by wt., and an isobutene content of about 30 to about 60% by wt., in the presence of a Lewis acid catalyst such as aluminum trichloride or boron trifluoride.

Also useful are the high molecular weight poly-n-butenes of U.S. Ser. No. 992,871 filed Dec. 17, 1992.

A preferred source of monomer for making poly-n-butenes is petroleum feedstreams such as Raffinate II. These feedstocks are disclosed in the art such as in U.S. Pat. No. 4,952,739.

Ethylene Alpha-Olefin Copolymer

Preferred polymers are polymers of ethylene and at least one alpha-olefin having the formula $H_2C=CHR^4$ wherein $R^4$ is straight chain or branched chain alkyl radical comprising 1 to 18 carbon atoms and wherein the polymer contains a high degree of terminal ethenylidene unsaturation. Preferably $R^4$ in the above formula is alkyl of from 1 to 8 carbon atoms and more preferably is alkyl of from 1 to 2 carbon atoms. Therefore, useful comonomers with ethylene in this invention include propylene, 1-butene, hexene-1, octene-1, etc., and mixtures thereof (e.g. mixtures of propylene and 1-butene, and the like). Preferred polymers are copolymers of ethylene and propylene and ethylene and butene-1.

The molar ethylene content of the polymers employed is preferably in the range of between about 20 and about 80%, and more preferably between about 30 and about 70%. When butene-1 is employed as comonomer with ethylene, the ethylene content of such copolymer is most preferably between about 20 and about 45 wt %, although higher or lower ethylene contents may be present. The most preferred ethylene-butene-1 copolymers are disclosed in U.S. Ser. No. 992,192, filed Dec. 17, 1992. The preferred method for making low molecular weight ethylene/α-olefin copolymer is described in U.S. Ser. No. 992,690, filed Dec. 17, 1992.

Preferred ranges of number average molecular weights of polymer for use as precursors for dispersants are from 500 to 10,000, preferably from 1,000 to 8,000, most preferably from 2,500 to 6,000. A convenient method for such determination is by size exclusion chromatography (also known as gel permeation chromatography (GPC)) which additionally provides molecular weight distribution information. Such polymers generally possess an intrinsic viscosity (as measured in tetralin at 135° C.) of between 0.025 and 0.6 dl/g, preferably between 0.05 and 0.5 dl/g, most preferably between 0.075 and 0.4 dl/g. These polymers preferably exhibit a degree of crystallinity such that, when grafted, they are essentially amorphous.

The preferred ethylene alpha-olefin polymers are further characterized in that up to about 95% and more of the polymer chains possess terminal vinylidene-type unsaturation. Thus, one end of such polymers will be of the formula POLY-C($R^{11}$)=$CH_2$ wherein $R^{11}$ is $C_1$ to $C_{18}$ alkyl, preferably $C_1$ to $C_8$ alkyl, and more preferably methyl or ethyl and wherein POLY represents the polymer chain. A minor amount of the polymer chains can contain terminal ethenyl unsaturation, i.e. POLY—CH=$CH_2$, and a portion of the polymers can contain internal monounsaturation, e.g. POLY—CH=CH($R^{11}$), wherein $R^{11}$ is as defined above.

The preferred ethylene alpha-olefin polymer comprises polymer chains, at least about 30% of which possess terminal vinylidene unsaturation. Preferably at least about 50%, more preferably at least about 60%, and most preferably at least about 75% (e.g. 75 to 98%), of such polymer chains exhibit terminal vinylidene unsaturation. The percentage of polymer chains exhibiting terminal vinylidene unsaturation may be determined by FTIR spectroscopic analysis, titration, HNMR or carbon-13 NMR.

Another preferred class of polymers are alpha-olefin polymers; i.e., alpha-olefin homopolymers of an alpha-olefin of formula $H_2C=CHR^4$ and alpha-olefin interpolymers of two or more alpha-olefins of formula $H_2C=CHR^4$, wherein $R^4$ is as defined above. The preferred alpha-olefin monomers are butene-1 and propylene and preferred alpha-olefin polymers are polypropylene, polybutene-1 and butene-1propylene copolymer (e.g., butene-1-propylene copolymers having 5 to 95 mole %, more typically 5 to 40 mole %, propylene). Preferred alpha-olefin polymers comprise polymer chains possessing high terminal unsaturation; i.e., at least about 30%, preferably at least about 50%, more preferably at least about 60%, and most preferably at least about 75% (e.g., 75 to 98%) of the chains have terminal vinylidene unsaturation. Isotactic and atactic polypropylenes are also useful examples of alpha-olefin polymers.

The polymers can be prepared by polymerizing monomer mixtures comprising ethylene with other monomers such as alpha-olefins, preferably from 3 to 4 carbon atoms in the presence of a metallocene catalyst system comprising at least one metallocene (e.g., a cyclopentadienyl-transition metal compound) and an activator, e.g. alumoxane compound. The comonomer content can be controlled through selection of the metallocene catalyst component and by controlling partial pressure of the monomers.

The catalyst is preferably a bulky ligand transition metal compound. The bulky ligand may contain a multiplicity of bonded atoms, preferably carbon atoms, forming a group which may be cyclic with one or more optional heteroatoms. The bulky ligand may be a cyclopentadienyl derivative which can be mono- or polynuclear. One or more bulky ligands may be bonded to the transition metal atom. The transition metal atom may be a Group IV, V or VI transition metal ("Group" refers to an identified group of the Periodic Table of Elements, comprehensively presented in "Advanced Inorganic Chemistry," F. A. Cotton, G. Wilkinson, Fifth Edition, 1988, John Wiley & Sons). Other ligands may be bonded to the transition metal, preferably detachable by a cocatalyst such as a hydrocarbyl or halogen leaving group. The catalyst is derivable from a compound of the formula

wherein L is the bulky ligand, X is the leaving group, M is the transition metal and m and n are such that the total ligand valency corresponds to the transition metal valency. Preferably the catalyst is four coordinate such that the compound is ionizable to a 1+ valency state.

The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cyclopentadienyl group.

For the purposes of this patent specification the term "metallocene" is defined to contain one or more cyclopentadienyl moiety in combination with a transition metal of the Periodic Table of Elements. In one embodiment the metallocene catalyst component is represented by the general formula $(Cp)_mMR_nR'_p$ wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. In another embodiment the metallocene catalyst is represented by the formulas:

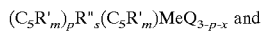 and

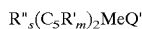

wherein Me is a Group IV, V, or VI transition metal $C_5R'_m$ is a substituted cyclopentadienyl each R', which can be the same or different is hydrogen, alkenyl aryl alkaryl or arylalkyl radical having from 1 to 20 carbon atoms or two carbon atoms joined together to form a part of a $C_4$ to $C_6$ ring, R" is one or more of or a combination of a carbon, a germanium, a silicon, a phosphorous or a nitrogen atom containing radical substituting on a bridging two $C_5R'_m$ rings or bridging one $C_5R'_m$ ring back to Me, when p=0 and x=1 otherwise x is always equal to 0, each Q which can be the same or different is an aryl alkyl, alkenyl, alkaryl, or arylalkyl radical having from 1 to 20 carbon atoms or halogen, Q' is an alkylidene radical having from 1 to 20 carbon atoms, s is 0 or 1 and when s is 0, m is 5 and p is 0, 1 or 2 and when s is 1, m is 4 and p is 1.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A-0129368 published Jul. 26, 1989, and U.S. Pat. No. 5,017,714 and U.S. Pat. No. 5,120,867 to Welborn, Jr. These publications teach the structure of the metallocene catalysts and include alumoxane as the cocatalyst. There are a variety of methods for preparing alumoxane, one of which is described in U.S. Pat. No. 4,665,208.

For the purposes of this patent specification, the terms "cocatalysts or activators" are used interchangeably and are defined to be any compound or component which can activate a bulky ligand transition metal compound. In one embodiment the activators generally contain a metal of Group II and III of the Periodic Table of Elements. In the preferred embodiment, the bulky transition metal compound are metallocenes, which are activated by trialkylaluminum compounds, alumoxanes both linear and cyclic, or ionizing ionic activators or compounds such as tri (n-butyl) ammonium tetra (pentafluorophenyl) boron, which ionize the neutral metallocene compound. Such ionizing compounds may contain an active proton, or some other cation associated with but not coordinated, or only loosely coordinated to the remaining ion of the ionizing ionic compound. Such compounds are described in EP-A-0520 732, EP-A-0 277 003 and EP-A-0 277 004 published Aug. 3, 1988, and U.S. Pat. Nos. 5,153,157; 5,198,401 and 5,241,025. Further, the metallocene catalyst component can be a monocyclopentadienyl heteroatom containing compound. This heteroatom is activated by either an alumoxane or an ionic activator to form an active polymerization catalyst system to produce polymers useful in this invention. These types of catalyst systems are described in, for example, PCT International Publication WO 92/00333 published Jan. 9, 1992, U.S. Pat. Nos. 5,057,475; 5,096,867; 5,055,438 and 5,227,440 and EP-A-0 420 436, WO 91/04257. In addition, the metallocene catalysts useful in this invention can include non-cyclopentadienyl catalyst components, or ancillary ligands such as boroles or carbollides in combination with a transition metal. Additionally, it is not beyond the scope of this invention that the catalysts and catalyst systems may be those described in U.S. Pat. No. 5,064,802 and PCT publications WO 93/08221 and WO 93/08199 published Apr. 29, 1993. All the catalyst systems of the invention may be, optionally, prepolymerized or used in conjunction with an additive or scavenging component to enhance catalytic productivity.

The polymer for use in the Koch reaction can include block and tapered copolymers derived from monomers comprising at least one conjugated diene with at least monovinyl aromatic monomer, preferably styrene. Such polymers should not be completely hydrogenated so that the polymeric composition contains olefinic double bonds, preferably at least one bond per molecule. The Koch reaction can also include star polymers as disclosed in patents such as U.S. Pat. Nos. 5,070,131; 4,108,945; 3,711,406; and 5,049,294.

Polymer Fractionation

Polymers useful for dispersants in lubricant applications can comprise a mixture or distribution of molecular weights. This distribution is a result of the processes used to make the polymers. Number average molecular weight is a useful way to represent the molecular weight distribution.

It has been found desirable to minimize or reduce, or eliminate completely, the amount of lower molecular weight polymers (e.g., light polymers) or monomers such as unreacted higher olefins from a given polymer molecular weight distribution to improve the performance of the final product.

In the Koch process as described herein, it has been found useful to minimize the amount of low molecular weight functionalized product (i.e., light functionalized product such as light ester) formed during the carbonylation step. Light functionalized product can be formed by two routes. Route one involves the introduction of light functionalized product precursors such as $C_4$ to $C_{24}$ olefins which are impurities in the polymer feed. Route two may involve the generation of breakdown products during the carbonylation reaction.

This invention relates to "route one". It has been found that by fractionating the raw polymer feed to remove light polymer and unreacted monomers such as olefins prior to the carbonylation step the amount of undesirable light functionalized polymer (e.g., polymer esters) that is generated is reduced and it has been further found that the polymer thus functionalized can be reacted with a nitrogen-containing compound to prepare a derivative of the fractionated polymer that has improved lubricating oil dispersant properties. The fractionating of the polymer feed can be accomplished by any suitable means, such as by distillation with or without a (partial) vacuum, by stripping with an inert gas (e.g., nitrogen) with or without a (partial) vacuum, by solvent extraction, or by selective sorption or the like. The fractionation can take place in a batch or continuous process. The process equipment utilized is not critical providing that the necessary conditions of temperature and negative pressure (e.g., vacuum) can be met. A short path evaporator (or wiped film evaporator) is a useful means for distilling the polymers and is known in the art. A typical short path evaporator comprises a vessel with product feed, and residue discharge means, a heating means and a distillate overhead with a condenser, a collector and vacuum pump. The evaporator should be equipped with a condenser and collector means for recovery and disposal of the light polymer removed from the polymer feed.

The evaporator should have sufficient volume to handle useful quantities of polymer feed (e.g., 50 kilograms per hour for a pilot unit and more for a commercial facility). The evaporator should be capable of heating the polymer feed to temperature high enough for efficient evaporation of the light polymer. Suitable temperatures are in the range of 180° to 300° C., preferably 200° to 240° C., most preferably 220° to 230° C. The evaporator may operate at atmospheric pressure but it is preferable to operate under negative pressure (e.g., vacuum) for more efficient distilling. Suitable vacuum is in the range of 0.5 to 50 mm Hg, preferably 1.0 to 30 mm Hg, more preferably 1.5 to 20 mm Hg. The efficiency of the light polymer removal may be improved by optional agitation of the polymer feed in the evaporator or by the use of inert gas stripping (e.g., nitrogen stripping) to assist in separating the light polymer from the polymer residue. Techniques such as these are known in the art.

Carbonylation is the part of the functionalization process wherein the unsaturated polymer is reacted with carbon monoxide in the presence of an acid catalyst, preferably $BF_3$, and a nucleophilic trapping agent, conveniently a halophenol such as 2,4-dichlorophenol, or, preferably 2-chloro-4-methylphenol. The resultant product is an ester with an attendant leaving group. This functionalized product can be subsequently derivatized with an amine to form the useful dispersant for lubricant additive applications. An excess over the stoichiometric amount of the halophenol is used in the reaction and it is necessary to remove the unreacted halophenol from the crude ester produced in the reaction and recover it for reuse. The crude ester produced in the carbonylation reaction consists essentially of unreacted halophenol, impurities and the functionalized polymer. The functionalized polymer includes lower molecular weight polymer and unreacted olefin monomers which range in carbon number from $C_4$ to $C_{24}$, which have been esterified.

The unreacted halophenol can be removed from the crude polymer ester in a process of evaporation, stripping, or distillation. Processes of this type are known in the art and can be run in equipment such as flash drums, falling film evaporators, forced film or wiped film evaporators, or short path evaporators or the like. In general, this equipment comprises a vessel or pipe wherein a liquid mass is heated to a temperature at which volatile material evaporates from the liquid mass. The process can be run at atmospheric pressure or under negative pressure (e.g., vacuum). Negative pressure is preferable. Agitation can be beneficial to assist in liquid/vapor disengagement. Use of an inert gas (e.g., nitrogen) passing through the liquid mass can also assist in liquid/vapor disengagement.

For removal of volatiles from viscous liquids, forced film or short path evaporators are preferred. Short path evaporators are particularly useful. Once the unreacted halophenol is removed from the crude polymer ester it is desired to condense and collect it for subsequent reuse. This can be achieved by use of a condenser and collector either external or internal to the short path evaporator. During the evaporation, components that boil lower than the functionalized polymer, such as the halophenol, light esters and chlorinated mixtures are removed overhead to the distillate stream. The bottom product of functionalized polymer is subsequently derivatized in an amination reactor.

The distillate is collected and then fractionally distilled to recover and recycle the unreacted halophenol. However, some of the impurities, especially light esters that boil close to halophenol as well as light halogenated compounds, are also inadvertently recycled. Ultimately the recycle stream will become saturated with undesirable components. Since the evaporation is a single stage operation, an equilibrium level of undesirables will build up in the process streams. The levels of light ester will increase in the residue product, possibly adversely affecting the performance of the final dispersant. In order to maintain low impurity levels, the distillate might have to be frequently purged. This is very costly. Thus, it is very desirable to minimize the amount of light ester present in the crude ester fed to the evaporators.

Hence, removal of the light ester precursors ($C_4$ to $C_{24}$ olefinic monomers or polymers) from the polymer prior to the carbonylation step is desirable.

Koch Reaction

In the Formula I, the letter n is generally greater than 0 and represents the functionality (F) or average number of functional groups per polymer chain, based on the polymer introduced into the Koch reaction. Thus, functionality can be expressed as the average number of moles of functional groups per "mole of polymer" charged to the functionalization reactor. Accordingly, F corresponds to n of Formula (I). The functionalized polymer product will generally include polymer molecules having no functional groups. Specific preferred embodiments of n include $1 \geq n > 0$; $2 \geq n > 1$; and $n > 2$. n can be determined by carbon-13 NMR. The optimum number of functional groups needed for desired performance will typically increase with $\overline{M}_n$ of the polymer. The maximum value of n will be determined by the number of double bonds per polymer chain in the unfunctionalized polymer.

In specific and preferred embodiments the "leaving group" ($-YR^3$) has a pKa of less than or equal to 12, preferably less than 10, and more preferably less than 8. The pKa is determined from the corresponding acidic species $HY-R^3$ in water at room temperature.

Where the leaving group is a simple acid or alkyl ester, the functionalized polymer is very stable especially as the % neo substitution increases. The Koch reaction is especially useful to make "neo" functionalized polymers which are generally more stable and less labile than iso structures. In preferred embodiments the polymer can be at least 60, more preferably at least 80 mole percent neofunctionalized. The polymer can be greater than 90, or 99 and even about 100 mole percent neo.

In one preferred composition the polymer defined by formula (I), Y is O (oxygen), and $R^1$ and $R^2$ are be the same or different and are selected from H, a hydrocarbyl group, and a polymeric group.

In another preferred embodiment Y is O or S, $R^1$ and $R^2$ are the same or different and are selected from H, a hydrocarbyl group a substituted hydrocarbyl group and a polymeric group, and $R^3$ is selected from a substituted hydrocarbyl group, an aromatic group (aryl) and a substituted aromatic group (substituted aryl). This embodiment is generally more reactive towards derivatization with amines and alcohol compounds especially where the $R^3$ substituent contains electron withdrawing species. It has been found that in this embodiment, a preferred leaving group, $HYR^3$, has a pKa of less than 12, preferably less than 10 and more preferably 8 or less. pKa values can range typically from 5 to 12, preferably from 6 to 10, and most preferably from 6 to 8. The pKa of the leaving group determines how readily the system will react with derivatizing compounds to produce derivatized product.

In a particularly preferred composition, $R^3$ is represented by the formula:

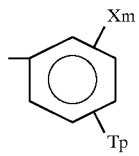

wherein X each of which may be the same or different, is an electron withdrawing substituent, T, each of which may be the same or different, represents a non-electron withdrawing substituent (e.g. electron donating), and m and p are from 0 to 5 with the sum of m and p being from 0 to 5. More preferably, m is from 1 to 5 and preferably 1 to 3. In a particularly preferred embodiment X is selected from a halogen, preferably F or Cl, $CF_3$, cyano groups and nitro groups and p=0. A preferred $R^3$ is derived from 2,4-dichlorophenol.

The composition derived from the present invention includes derivatized polymer which is the reaction product of the Koch functionalized polymer and a derivatizing compound. Preferred derivatizing compounds include nucleophilic reactant compounds including amines, alcohols, amino-alcohols, metal reactant compounds and mixtures thereof. Derivatized polymer will typically contain at least one of the following groups: amide, imide, oxazoline, and ester, and metal salt. The suitability for a particular end use may be improved by appropriate selection of the polymer. $\overline{M}_n$ and functionality used in the derivatized polymer is discussed hereinafter.

The Koch reaction permits controlled functionalization of unsaturated polymers. When a carbon of the carbon—carbon double bond is substituted with hydrogen, it will result in an "iso" functional group, i.e. one of $R^1$ or $R^2$ of Formula I is H; or when a carbon of the double bond is fully substituted with hydrocarbyl groups it will result in an "neo" functional group, i.e. both $R^1$ or $R^2$ of Formula I are non-hydrogen groups.

Polymers produced by processes which result in a terminally unsaturated polymer chain can be functionalized to a relatively high yield in accordance with the process of the present invention. It has been found that the neo acid functionalized polymer can be derivatized to a relatively high yield. The Koch process also makes use of relatively inexpensive materials i.e., carbon monoxide at relatively low temperatures and pressures. Also the leaving group —$YR^3$ can be removed and recycled upon derivatizing the Koch functionalized polymer with amines or alcohols. The functionalized or derivatized polymers of the present invention are useful as lubricant additives such as dispersants, viscosity improvers and multifunctional viscosity improvers. The composition derived from the present invention includes oleaginous compositions comprising the above functionalized, and/or derivatized polymer. Such compositions include lubricating oil compositions and concentrates. The Koch reaction also provides a process which comprises the step of catalytically reacting in admixture: (a) at least one fractionated hydrocarbon polymer as described herein and containing ethylenic double bonds; (b) carbon monoxide, (c) at least one acid catalyst, and (d) a nucleophilic trapping agent selected from the group consisting of water, hydroxy-containing compounds and thiol-containing compounds, the reaction being conducted a) in the absence of reliance on transition metal as a catalyst; or b) with at least one acid catalyst having a Hammett acidity of less than −7; or c) wherein functional groups are formed at least 40 mole % of the ethylenic double bonds; or d) wherein the nucleophilic trapping agent has a pKa of less than 12.

The process of the present invention relates to a polymer having at least one ethylenic double bond reacted via a Koch mechanism to form carbonyl or thio carbonyl group-containing compounds, which may subsequently be derivatized. The polymers react with carbon monoxide in the presence of an acid catalyst or a catalyst preferably complexed with the nucleophilic trapping agent. A preferred catalyst is $BF_3$ and preferred catalyst complexes include $BF_3.H_2O$ and $BF_3$ complexed with 2,4-dichlorophenol. The starting polymer reacts with carbon monoxide at points of unsaturation to form either iso- or neo-acyl groups with the nucleophilic trapping agent, e.g. with water, alcohol (preferably a substituted phenol) or thiol to form respectively a carboxylic acid, carboxylic ester group, or thio ester.

In a preferred process, at least one polymer having at least one carbon—carbon double bond is contacted with an acid catalyst or catalyst complex having a Hammett Scale acidity value of less than −7, preferably from −8.0 to −11.5 and most preferably from −10 to −11.5. Without wishing to be bound by any particular theory, it is believed that a carbenium ion may form at the site of one of carbon—carbon double bonds. The carbenium ion may then react with carbon monoxide to form an acylium cation. The acylium cation may react with at least one nucleophilic trapping agent as defined herein.

At least 40 mole %, preferably at least 50 mole %, more preferably at least 80 mole %, and most preferably 90 mole % of the polymer double bonds will react to form acyl groups wherein the non-carboxyl portion of the acyl group is determined by the identity of the nucleophilic trapping agent, i.e. water forms acid, alcohol forms acid ester and thiol forms thio ester. The polymer functionalized by the recited process of the present invention can be isolated using fluoride salts. The fluoride salt can be selected from the group consisting of ammonium fluoride, and sodium fluoride.

Preferred nucleophilic trapping agents are selected from the group consisting of water, monohydric alcohols, polyhydric alcohols hydroxyl-containing aromatic compounds and hetero substituted phenolic compounds. The catalyst and nucleophilic trapping agent can be added separately or combined to form a catalytic complex.

Following is an example of a terminally unsaturated polymer reacted via the Koch mechanism to form an acid or an ester. The polymer is contacted with carbon monoxide or a suitable carbon monoxide source such as formic acid in the presence of an acidic catalyst. The catalyst contributes a proton to the carbon—carbon double bond to form a carbenium ion. This is followed by addition of CO to form an acylium ion which reacts with the nucleophilic trapping agent. POLY, Y, $R^1$, $R^2$ and $R^3$ are defined as above.

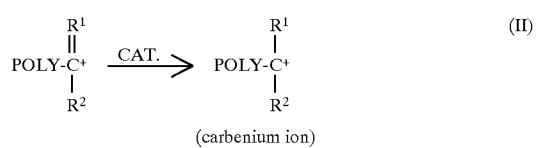

(carbenium ion)

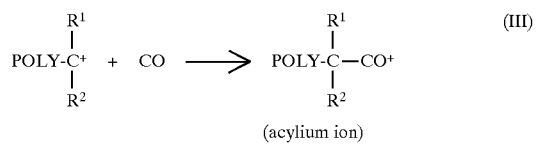

(acylium ion)

-continued

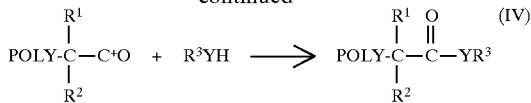

The Koch reaction is particularly useful to functionalize poly(alpha olefins) and ethylene alpha olefin copolymers formed using metallocene-type catalysts. These polymers contain terminal vinylidene groups. There is a tendency for such terminal groups to predominate and result in neo-type (tertiary) carbenium ions. In order for the carbenium ion to form, the acid catalyst is preferably relatively strong. However, the strength of the acid catalyst is preferably balanced against detrimental side reactions which can occur when the acid is too strong.

The Koch catalyst can be employed by preforming a catalyst complex with the proposed nucleophilic trapping agent or by adding the catalyst and trapping agent separately to the reaction mixture. This later embodiment has been found to be a particular advantage since it eliminates the step of making the catalyst complex.

The following are examples of acidic catalyst and catalyst complex materials with their respective Hammett Scale Value acidity: 60% $H_2SO_4$, −4.32; $BF_3.3H_2O$, −4.5; $BF_3.2H_2O$, −7.0; $WO_3/Al_2O_3$, less than −8.2; $SiO_2/Al_2O_3$, less than −8.2; HF, −10.2; $BF_3.H_2O$, −11.4; −11.94; $ZrO_2$ less than −12.7; $SiO_2/Al_2O_3$, −12.7 to −13.6; $AlCl_3$, −13.16 to −13.75; $AlCl_3/CuSO_4$, −13.75 to −14.52.

It has been found that $BF_3.2H_2O$ is ineffective at functionalizing polymer through a Koch mechanism ion with polymers. In contrast, $BF_3.H_2O$ resulted in high yields of carboxylic acid for the same reaction. The use of $H_2SO_4$ as a catalyst involves control of the acid concentration to achieve the desired Hammett Scale Value range. Preferred catalysts are $H_2SO_4$ and $BF_3$ catalyst systems.

Suitable $BF_3$ catalyst complexes for use in the present invention can be represented by the formula:

$$BF_3.xHOR$$

wherein R can represent hydrogen, hydrocarbyl (as defined below in connection with R') —CO—R', —$SO_2$—R', —PO—$(OH)_2$, and mixtures thereof wherein R' is hydrocarbyl, typically alkyl, e.g., $C_1$ to $C_{20}$ alkyl, and, e.g., $C_6$ to $C_{14}$ aryl, aralkyl, and alkaryl, and x is less than 2.

Following reaction with CO, the reaction mixture is further reacted with water or another nucleophilic trapping agent such as an alcohol or phenolic, or thiol compound. The use of water releases the catalyst to form an acid. The use of hydroxy trapping agents releases the catalyst to form an ester, the use of a thiol releases the catalyst to form a thio ester.

Koch product, also referred to herein as functionalized polymer, typically will be derivatized as described hereinafter. Derivatization reactions involving ester functionalized polymer will typically have to displace the alcohol derived moiety therefrom. Consequently, the alcohol derived portion of the Koch functionalized polymer is sometimes referred to herein as a leaving group. The ease with which a leaving group is displaced during derivatization will depend on its acidity, i.e. the higher the acidity the more easily it will be displaced. The acidity in turn of the alcohol is expressed in terms of its pKa.

Preferred nucleophilic trapping agents include water and hydroxy group containing compounds. Useful hydroxy trapping agents include aliphatic compounds such as monohydric and polyhydric alcohols or aromatic compounds such as phenols and naphthols. The aromatic hydroxy compounds from which the esters of this invention may be derived are illustrated by the following specific examples: phenol, naphthol, cresol, resorcinol, catechol, the chlorophenols.

The alcohols preferably can contain up to about 40 aliphatic carbon atoms. They may be monohydric alcohols such as methanols, ethanol, benzyl alcohol, 2-methylcyclohexanol, beta-chloroethanol, monomethyl ether of ethylene glycol, etc. The polyhydric alcohols preferably contain from 2 to about 5 hydroxy radicals; e.g., ethylene glycol, diethylene glycol. Other useful polyhydric alcohols include glycerol, monomethyl ether of glycerol, and pentaerythritol. Useful unsaturated alcohols include allyl alcohol, and propargyl alcohol. Particularly preferred alcohols include those having the formula $R*_2CHOH$ where an R* is independently hydrogen, an alkyl, aryl, hydroxyalkyl, or cycloalkyl. Specific alcohols include alkanols such as methanol, ethanol, etc. Also preferred useful alcohols include aromatic alcohols, phenolic compounds and polyhydric alcohols as well as monohydric alcohols such as 1,4-butanediol.

It has been found that neo-acid ester functionalized polymer is extremely stable due, it is believed, to stearic hindrance. Consequently, the yield of derivatized polymer obtainable therefrom will vary depending on the ease with which a derivatizing compound can displace the leaving group of the functionalized polymer.

The most preferred alcohol trapping agents may be obtained by substituting a phenol with at least one electron withdrawing substituent such that the substituted phenol possesses a pKa within the above described preferred pKa ranges. In addition, phenol may also be substituted with at least one non-electron withdrawing substituent (e.g., electron donating), preferably at positions meta to the electron withdrawing substituent to block undesired alkylation of the phenol by the polymer during the Koch reaction. This further improves yield to desired ester functionalized polymer.

Accordingly, and in view of the above, the most preferred trapping agents are phenolic and substituted phenolic compounds represented by the formula:

wherein X, which may be the same or different, is an electron withdrawing substituent, and T which may be the same or different is a non-electron withdrawing group; m and p are from 0 to 5 with the sum of m and p being from 0 to 5, and m is preferably from 1 to 5, and more preferably, m is 1 or 2. X is preferably a group selected from halogen, cyano, and nitro, preferably located at the 2- and/or 4- position, and T is a group selected from hydrocarbyl, and hydroxy groups and p is 1 or 2 with T preferably being located at the 4 and/or 6 position. More preferably X is selected from Cl, F, Br, cyano or nitro groups and m is preferably from 1 to 5, more preferably from 1 to 3, and more preferably 1 to 2.

A particularly preferred group of trapping agents encompassed by Formula (V) are the halophenols and especially the chlorophenols including monochlorophenols such as 2-chlorophenol and 4-chlorophenol, dichlorophenols such as 2,4-dichlorophenol, and chloroalkylphenols such as 2-chloro4-methylphenol and 4-chloro-2-methylphenol. The trapping agent is preferably selected from 2,4- dichlorophenol and 2-chloro4-methyl phenol, and is most preferably 2-chloro4-methylphenol.

The relative amounts of reactants and catalyst, and the conditions controlled in a manner sufficient to functionalize typically at least about 40, preferably at least about 80, more preferably at least about 90 and most preferably at least about 95 mole % of the carbon—carbon double bonds initially present in the unfunctionalized polymer.

The amount of $H_2O$, alcohol, or thiol used is preferably at least the stoichiometric amount required to react with the acylium cations. It is preferred to use an excess of alcohol over the stoichiometric amount. The alcohol performs the dual role of reactant and diluent for the reaction. However, the amount of the alcohol or water used should be sufficient to provide the desired yield yet at the same time not dilute the acid catalyst so as to adversely affect the Hammett Scale Value acidity.

The polymer added to the reactant system can be in a liquid phase. Optionally, the polymer can be dissolved in an inert solvent. The yield can be determined upon completion of the reaction by separating polymer molecules which contain acyl groups which are polar and hence can easily be separated from unreacted non-polar compounds. Separation can be performed using absorption techniques which are known in the art. The amount of initial carbon—carbon double bonds and carbon—carbon double bonds remaining after the reaction can be determined by $C^{13}$ NMR techniques.

In accordance with the process, the polymer is heated to a desired temperature range which is typically between −20° C. to 200° C., preferably from 0° C. to 80° C. and more preferably from 20° C. to 65° C. Temperature can be controlled by heating and cooling means applied to the reactor. Since the reaction is exothermic usually cooling means are required. Mixing is conducted throughout the reaction to assure a uniform reaction medium.

The catalyst (and nucleophilic trapping agent) can be prereacted to form a catalyst complex or are charged separately in one step to the reactor to form the catalyst complex in situ at a desired temperature and pressure, preferably under nitrogen. In a preferred system the nucleophilic trapping agent is a substituted phenol used in combination with $BF_3$. The reactor contents are continuously mixed and then rapidly brought to a desired operating pressure using a high pressure carbon monoxide source. Useful pressures can be up to 138,000 kPa (20,000 psig), and typically will be at least 2070 kPa (300 psig), preferably at least 5,520 kPa (800 psig), and most preferably at least 6,900 kPa 1,000 psig), and typically will range from 3450 to 34,500 kPa (500 to 5,000 psig) preferably from 4485 to 20,700 kPa (650 to 3,000 psig) and most preferably from 4485 to 13,800 kPa (650 to 2000 psig). The carbon monoxide pressure may be reduced by adding a catalyst such as a copper compound. The catalyst to polymer volume ratio can range from 0.25 to 4, preferably 0.5 to 2 and most preferably 0.75 to 1.3.

Preferably, the polymer, catalyst, nucleophilic trapping agent and CO are fed to the reactor in a single step. The reactor contents are then held for a desired amount of time under the pressure of the carbon monoxide. The reaction time can range up to 5 hours and typically 0.5 to 4 and more typically from 1 to 2 hours. The reactor contents can then be discharged and the product which is a Koch functionalized polymer comprising either a carboxylic acid or carboxylic ester or thiol ester functional groups separated. Upon discharge, any unreacted CO can be vented off. Nitrogen can be used to flush the reactor and the vessel to receive the polymer.

Depending on the particular reactants employed, the functionalized polymer containing reaction mixture may be a single phase, a combination of a partitionable polymer and acid phase or an emulsion with either the polymer phase or acid phase being the continuous phase. Upon completion of the reaction, the polymer is recovered by suitable means.

When the mixture is an emulsion, a suitable means can be used to separate the polymer. A preferred means is the use of fluoride salts, such as sodium or ammonium fluoride in combination with an alcohol such as butanol or methanol to neutralize the catalyst and phase separate the reaction complex. The fluoride ion helps trap the $BF_3$ complexed to the functionalized polymer and helps break emulsions generated when the crude product is washed with water. Alcohols such as methanol and butanol and commercial demulsifiers also help to break emulsions especially in combination with fluoride ions. Preferably, nucleophilic trapping agent is combined with the fluoride salt and alcohols when used to separate polymers. The presence of the nucleophilic trapping agent as a solvent minimizes transesterification of the functionalized polymer.

Where the nucleophilic trapping agent has a pKa of less than 12 the functionalized polymer can be separated from the nucleophilic trapping agent and catalyst by depressurization and distillation. It has been found that where the nucleophilic trapping agent has lower pKa's, the catalyst, i.e. $BF_3$ releases more easily from the reaction mixture.

As indicated above, polymer which has undergone the Koch reaction is also referred to herein as functionialized polymer. Thus, a functionalized polymer comprises molecules which have been chemically modified by at least one functional group so that the functionalized polymer is (a) capable of undergoing further chemical reaction (e.g. derivatization) or (b) has desirable properties, not otherwise possessed by the polymer alone, absent such chemical modification.

It will be observed from the discussion of formula I that the functional group is characterized as being represented by the parenthetical expression

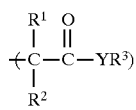

which expression contains the acyl group

It will be understood that while the

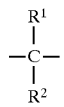

moiety is not added to the polymer in the sense of being derived from a separate reactant it is still referred to as being part of the functional group for ease of discussion and description. Strictly speaking, it is the acyl group which constitutes the functional group, since it is this group which is added during chemical modification. Moreover, $R^1$ and $R^2$ represent groups originally present on, or constituting part of, the 2 carbons bridging the double bond before functionalization. However, $R^1$ and $R^2$ were included within the parenthetical so that neo acyl groups could be differentiated from iso acyl groups in the formula depending on the identity of $R^1$ and $R^2$.

Other Functionalization Methods

While the functionalized, fractionated polymer of the present invention is preferably prepared using the Koch reaction as heretofore described, it can also be prepared by any method suitable for introducing mono- or dicarboxylic acid producing groups (e.g., acid, ester, or anhydride groups) into the fractionated polymer. The functionalized, fractionated polymer can be prepared, for example, by reacting the fractionated polymer with a monounsaturated carboxylic reactant, which is typically a monounsaturated monocarboxylic acid producing compound or a monounsaturated dicarboxylic acid producing compound or mixtures thereof. Preferably, the reactant comprises at least one member selected from the group consisting of (i) monounsaturated $C_4$ to $C_{10}$ dicarboxylic acid wherein (a) the carboxyl groups are vicinal (i.e., located on adjacent carbon atoms) and (b) at least one, preferably both, of the adjacent carbon atoms are part of said monounsaturation; (ii) derivatives of (i) such as anhydrides or $C_1$ to $C_5$ alcohol-derived mono- or diesters of (i); (iii) monounsaturated $C_3$ to $C_{10}$ monocarboxylic acid wherein the carbon—carbon double bond is conjugated to the carboxy groups (i.e., —C═C—C(═O)—); and (iv) derivatives of (iii) such as $C_1$ to $C_5$ alcohol derived monoesters of (iii).

Exemplary monounsaturated carboxylic reactants are fumaric acid, itaconic acid, maleic acid, maleic anhydride, chloromaleic anhydride, acrylic acid, methacrylic acid, and $C_1$ to $C_4$ alkyl esters of the foregoing; e.g., methyl maleate, ethyl fumarate, methyl acrylate, etc. Maleic anhydride is the preferred monounsaturated carboxylic reactant.

The fractionated polymer can be functionalized by reaction with the monounsaturated carboxylic reactant using a variety of methods. For example, the polymer can be first chlorinated to about 1 to 8 wt. % chlorine based on the weight of the polymer by passing chlorine through the polymer at a temperature of about 60° to 250° C. for about 0.5 to 10 hours. The chlorinated polymer may then be reacted with sufficient monounsaturated carboxylic reactant at about 100° to 250° C. for about 0.5 to 10 hours, so the product obtained will contain the desired number of moles of the monounsaturated carboxylic reactant per mole of chlorinated polymer. Processes of this general type are taught in, for example, U.S. Pat. Nos. 3,087,436, 3,172,892, and 3,272,746. Alternatively, the fractionated polymer and the monounsaturated carboxylic reactant can be mixed and heated while adding chlorine to the hot material. Processes of this type are disclosed in, for example, U.S. Pat. Nos. 3,215,707, 3,231,587, 3,912,764, 4,110,349 and 4,234,435. Fractionated polyisobutene (e.g., having a $\overline{M}_n$ of from 700 to 3,000, or more preferably from 900 to 2,500, and having a MWD of from 1.2 to 2.5) is a preferred for use in these reactions.

The fractionated polymer and the monounsaturated carboxylic reactant can also be contacted at elevated temperatures to cause a thermal ene reaction to occur. Generally, the polymer and the carboxylic reactant will be contacted with stirring and in the absence of $O_2$ and water (e.g., under $N_2$) in a carboxylic reactant to polymer mole ratio of about 1:1 to 10:1 at a temperature of about 120° to 260° C. for about 1 to 20 hours. Thermal ene processes are described, for example, in U.S. Pat. No. 3,361,673 and U.S. Pat. No. 3,401,118. Fractionated polyisobutene (e.g., having a $\overline{M}_n$ of from 700 to 3,000, or more preferably from 900 to 2,500, and having a MWD of from 1.2 to 2.5) is also a preferred for use in these reactions.

Typically, where the end use of the polymer is for making dispersant, e.g. as derivatized polymer, the polymer will possess dispersant range molecular weights ($\overline{M}_n$) as defined hereinafter and the functionality will typically be significantly lower than for polymer intended for making derivatized multifunctional V.I. improvers, where the polymer will possess viscosity modifier range molecular weights ($\overline{M}_n$) as defined hereinafter.

Accordingly, while any effective functionality can be imparted to functionalized, fractionated polymer intended for subsequent derivatization, it is contemplated that such functionalities, expressed as F, for dispersant end uses, are typically not greater than about 3, preferably not greater than about 2, and typically can range from about 0.5 to about 3, preferably from 0.8 to about 2.0 (e.g. 0.8 to 1).

Similarly, effective functionalities F for viscosity modifier end uses of derivatized polymer are contemplated to be typically greater than about 3, preferably greater than about 5, and typically will range from 5 to about 10. End uses involving very high molecular weight polymers contemplate functionalities which can range typically greater than about 20, preferably greater than about 30, and most preferably greater than about 40, and typically can range from 20 to 60, preferably from 25 to 55 and most preferably from 30 to 50.

As indicated above, the functionalization step can also be accomplished by alkylating a hydroxy aromatic compound (e.g., phenol) with the fractionated polymer to form a polymer substituted hydroxy aromatic compound, and wherein the resulting polymer substituted hydroxy aromatic compound is then derivatized by reaction with an aldehyde and an amine (e.g., an alkylene polyamine) to form a Mannich base dispersant, as will be discussed more fully below.

Derivatized Polymers

The functionalized polymer can be used as a dispersant/multifunctional viscosity modifier if the functional group contains the requisite polar group. The functional group can also enable the polymer to participate in a variety of chemical reactions. Derivatives of functionalized polymers can be formed through reaction of the functional group. These derivatized polymers may have the requisite properties for a variety of uses including use as dispersants and viscosity modifiers. A derivatized polymer is one which has been chemically modified to perform one or more functions in a significantly improved way relative to the unfunctionalized polymer and/or the functionalized polymer. Representative of such functions, are dispersancy and/or viscosity modification in lubricating oil compositions.

The derivatizing compound typically contains at least one reactive derivatizing group selected to react with the functional groups of the functionalized polymers by various reactions. Representative of such reactions are nucleophilic substitution, transesterification, salt formation, and the like. The derivatizing compound preferably also contains at least one additional group suitable for imparting the desired properties to the derivatized polymer, e.g., polar groups. Thus, such derivatizing compounds typically will contain one or more groups including amine, hydroxy, ester, amide, imide, thio, thioamido, oxazoline, or carboxylate groups or form such groups at the completion of the derivatization reaction.

The derivatized polymers include the reaction product of the above recited functionalized polymer with a nucleophilic reactant which include amines, alcohols, amino-alcohols and mixtures thereof to form oil soluble salts, amides, oxazoline, and esters. Alternatively, the functionalized polymer can be reacted with basic metal salts to form metal salts of the polymer. Preferred metals are Ca, Mg, Cu, Zn, Mo, Na, K, Mn and the like.

Functionalized, fractionated polymers prepared by reacting the fractionated polymer with a monounsaturated carboxylic reactant, which is typically a monounsaturated monocarboxylic acid producing compound or a monounsaturated dicarboxylic acid producing compound or mixtures thereof, can be reacted with a amine or hydroxyamine or alcohol compound according to methods known in the art using a variety of methods. For example, a polymer-substituted (e.g., polyisobutenyl-substituted) succinic anhydride or succinic acid, prepared by reaction of a fractionated polymer (e.g., polyisobutene) of this invention with maleic anhydride, can be reacted with an alkylene polyamine or hydroxy amine using the methods disclosed in U.S. Pat. Nos. 4,683,624, 4,102,798, 4,116,876, 4,113,639, 5,266,223, (the disclosures which are hereby incorporated by reference in their entirety).

Mannich condensation lubricating oil dispersants can be prepared by condensing about 1 mole of a high molecular weight hydrocarbyl substituted hydroxy aromatic material such as mono- or polyhydroxy benzene (wherein the high molecular weight hydrocarbyl substitutent comprises the fractionated polymer of this invention, e.g., having a number average molecular weight of 700 or greater) with about 1 to 2.5 moles of an aldehyde such as formaldehyde or paraformaldehyde and about 0.5 to 2 moles polyamine as disclosed, e.g., in U.S. Pat. Nos. 3,442,808; 3,649,229, 3,798,165, 5,017,299, 5,186,851, 5,382,698, and 5,433,874 and U.S. Ser. No. 376,378, filed Dec. 30, 1994. and U.S. Ser. No. 322,715, filed Oct. 12, 1994 (the disclosures which are hereby incorporated by reference in their entirety).

Suitable properties sought to be imparted to the derivatized polymer include one or more of dispersancy, multifunctional viscosity modification, antioxidancy, friction modification, antiwear, antirust, seal swell, and the like. The preferred properties sought to be imparted to the derivatized polymer include dispersancy (both mono- and multifunctional) and viscosity modification primarily with attendant secondary dispersant properties. A multifunctional dispersant typically will function primarily as a dispersant with attendant secondary viscosity modification.

While the Koch functionalization and derivatization techniques for preparing multifunctional viscosity modifiers (also referred to herein as multifunctional viscosity index improvers or MFVI) are the same as for ashless dispersants, the functionality of a functionalized polymer intended for derivatization and eventual use as an MFVI will be controlled to be higher than functionalized polymer intended for eventual use as a dispersant. This stems from the difference in $\overline{M}_n$ of the MFVI polymer backbone vs. the $\overline{M}_n$ of the dispersant polymer backbone.

Accordingly, it is contemplated that an MFVI will be derived from functionalized polymer having typically up to about one and at least about 0.5 functional groups, (i.e. "n" of formula (I)) for each 20,000, preferably for each 10,000, most preferably for each 5,000 $\overline{M}_n$ molecular weight segment in the backbone polymer.

Dispersants

Dispersants maintain oil insolubles, resulting from oil use, in suspension in the fluid thus preventing sludge flocculation and precipitation. Suitable dispersants include, for example, dispersants of the ash-producing (also known as detergents) and ashless type, the latter type being preferred. The derivatized polymer compositions of the present invention, can be used as ashless dispersants and multifunctional viscosity index improvers in lubricant and fuel compositions.

At least one functionalized polymer is mixed with at least one of amine, alcohol, including polyol, aminoalcohol, etc., to form the dispersant additives. One class of particularly preferred dispersants are those derived from the functionalized polymer of the present invention reacted with (i) hydroxy compound, e.g., a polyhydric alcohol or polyhydroxy-substituted aliphatic primary amine such as pentaerythritol or trismethylolaminomethane (ii) polyoxyalkylene polyamine, e.g. polyoxypropylene diamine, and/or (iii) polyalkylene polyamine, e.g., polyethylene polyamine such as tetraethylene pentamine referred to herein as TEPA.

Derivatization by Amine Compounds

Useful amine compounds for derivatizing functionalized polymers comprise at least one amine and can comprise one or more additional amine or other reactive or polar groups. Where the functional group is a carboxylic acid, carboxylic ester or thiol ester, it reacts with the amine to form an amide. Preferred amines are aliphatic saturated amines. Useful amines include polyalkylene polyamines having about 2 to 60 (e.g., 2 to 30), preferably 2 to 40 (e.g., 3 to 20) total carbon atoms and about 1 to 12 (e.g., 2 to 9), preferably 3 to 12 nitrogen atoms in the molecule. Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine, di-(1,2-propylene) triamine and di-(1,3-propylene) triamine; N,N-dimethyl-1,3-diaminopropane; N,N'-di-(2-aminoethyl) ethylene diamine, 3-dodecylpropylamine, N-dodecyl-1,3-propane diamine; mono-, di-, and tri-tallow amines; aminomorpholines such as N-(3-aminopropyl) morpholine; and mixtures thereof.

Hydroxyamines which can be used include 2-amino-1-butanol, 2-amino-2-methyl-1-propanol, p-(beta-hydroxyethyl)-aniline, 2-amino-1-propanol, 3-amino-1-propanol, 2-amino-2-methyl 1,3-propane-diol, 2-amino-2-ethyl-1,3-propanediol, N-(beta-hydroxypropyl)-N'-(beta-amino-ethyl)-piperazine, tris(hydroxymethyl) aminomethane (also known as trismethylolaminomethane), 2-amino-1-butanol, ethanolamine, beta-(beta-hydroxyethoxy)-ethylamine and the like. Mixtures of these or similar amines can also be employed.

Other useful amine compounds include: alicyclic diamines such as 1,4-di(aminomethyl) cyclohexane, and heterocyclic nitrogen compounds such as imidazolines. Mixtures of amine compounds may advantageously be used, such as commercial mixtures of polyethylene polyamines averaging 5 to 7 nitrogen atoms per molecule available under the trade names E-100 (Dow Chemical) and HPA-X (Union Carbide). Useful amines also include polyoxyalkylene polyamines. A particularly useful class of amines are the polyamido and related amines.

The amine compound can be a heavy polyamine, which is defined herein as a mixture of higher oligomers of polyalkylene polyamines, having an average of at least about 7 nitrogen atoms per molecule. A preferred heavy polyamine is a mixture of polyethylene polyamines containing essentially no TEPA, at most small amounts of pentaethylene hexamine, and the balance oligomers with more than 6 nitrogens, the heavy polyamine having more branching than conventional commercial polyamines mixtures, such as the E-100 and HPA-X mixtures noted in the preceding paragraph. A useful heavy polyamine composition is commercially available from Dow Chemical under the tradename HA-2. Useful heavy polyamines are further described in U.S. Ser. No. 273,294, filed Jul. 11, 1994, herein incorporated by reference in its entirety.

Derivatization by Alcohols

The functionalized polymers of the present invention can be reacted with alcohols, e.g. to form esters. The alcohols may be aliphatic compounds such as monohydric and polyhydric alcohols or aromatic compounds such as phenols and naphthols. The aromatic hydroxy compounds from which the esters may be derived are illustrated by the following specific examples: phenol, beta-naphthol, alpha-naphthol, cresol, resorcinol, catechol, etc. Phenol and alkylated phenols having up to three alkyl substituents are preferred. The alcohols from which the esters may be derived preferably contain up to about 40 aliphatic carbon atoms. They may be monohydric alcohols such as methanols, ethanol, isooctanol, etc. A useful class of polyhydric alcohols are those having at least three hydroxy radicals, some of which have been esterified with a monocarboxylic acid having from about 8 to about 30 carbon atoms, such as octanoic acid, oleic acid, stearic acid, linoleic acid, dodecanoic acid, or tall oil acid.

The esters may also be derived from unsaturated alcohols such as allyl alcohol, cinnamyl alcohol, propargyl alcohol. Still another class of the alcohols capable of yielding the esters of this invention comprise the ether-alcohols and amino-alcohols including, for example, the oxyalkylene-, oxyarylene-, amino-alkylene-, and amino-arylene-substituted alcohols having one or more oxyalkylene, amino-alkylene or amino-arylene oxyarylene radicals. They are exemplified by Cellosolve, carbitol, phenoxyethanol, etc.

The functionalized polymer of this invention is reacted with the alcohols according to conventional esterification, or transesterification techniques. This normally involves heating the functionalized polymer with the alcohol, optionally in the presence of a normally liquid, substantially inert, organic liquid solvent/diluent and/or in the presence of esterification catalyst.

Derivatization by Reactive Metals/Metal Compounds

Useful reactive metals or reactive metal compounds are those which will form metal salts of the functionalized polymer or metal-containing complexes with the functionalized polymer. Metal complexes are typically achieved by reacting the functionalized polymers with amines and/or alcohols as discussed above and also with complex forming reactants either during or subsequent to amination. Complex-forming metal reactants include the nitrates, nitrites, halides, carboxylates, etc.

The appropriate functionalized polymer of this invention can be reacted with any individual derivatizing compound such as amine, alcohol, reactive metal, reactive metal compound or any combination of two or more of any of these; that is, for example, one or more amines, one or more alcohols, one or more reactive metals or reactive metal compounds, or a mixture of any of these. Substantially inert organic liquid diluents may be used to facilitate mixing, temperature control, and handling of the reaction mixture.

The reaction products produced by reacting functionalized polymer of this invention with derivatizing compounds such as alcohols, nitrogen-containing reactants, metal reactants, and the like will, in fact, be mixtures of various reaction products. The functionalized polymers themselves can be mixtures of materials. While the functionalized polymers themselves possess some dispersant characteristics and can be used as dispersant additives in lubricants and fuels, best results are achieved when at least about 30, preferably, at least about 50, most preferably 100% of the functional groups are derivatized.

Post Treatment

The functionalized and/or derivatized polymers from the present invention may be post-treated. U.S. Ser. No. 534, 891, filed Sep. 25, 1995, discloses processes for post treatment and is incorporated herein by reference. For example, the functionalized polymers derivatized with amine compounds can be borated by treatment with a borating agent. Suitable borating agents include boron halides (e.g., boron trifluoride, boron tribromide, boron trichloride), boron acids, and simple esters of the boron acids (e.g., trialkyl borates containing 1 to 8 carbon alkyl groups such as methyl, ethyl, n-octyl, 2-ethylhexyl, etc.)

The boration reaction is typically carried out by adding from about 0.05 to 5 wt. %, e.g. 1 to 3 wt. %, (based on the weight of the amine-containing polymeric material) of the borating agent, and heating with stirring at from about 90° to 250° C., preferably 135° to 190° C., e.g., 140° to 170° C., for from about 1 to 10 hours followed by nitrogen stripping in said temperature ranges. The borating agent is preferably boric acid which is most usually added as a slurry to the reaction mixture.

A preferred low sediment process involves borating with a particulate boric acid having a particle size distribution characterized by a φ value of not greater than about 450. The process is described in U.S. Pat. No. 5,430,105, herein incorporated by reference.

The borated product contains at least about 0.01 up to about 10 wt. % boron based on the total weight of product, but preferably has 0.05 to 5 wt. %, e.g., 0.05 to 2 wt. % boron.

Lubricating Compositions

The functionalized polymers of this invention, in addition to acting as intermediates for dispersant and MFVI manufacture, can be used as molding release agents, molding agents, metal working lubricants, point thickeners and the like. The primary utility for the products of the invention, from functionalized polymer all the way through post-treated derivatized polymer, is as additives for oleaginous compositions.

The additives of the invention may be used by incorporation into an oleaginous material such as fuels and lubricating oils. U.S. Ser. No. 534,891 discloses the use of the additive derived from the present invention in fuels and lubricating oils and is incorporated herein by reference.

EXAMPLES

In the examples below, a significant reduction in the amount of light ester impurity generated was achieved by prestripping the polymer prior to feeding the polymer to the carbonylation reactor.

In Example 1 a polymer feed was prestripped in a short path evaporator to eliminate light polymer (light ester precursors). The distillate was discarded. This prestripped polymer was fed into the carbonylation reaction (Example A) and reacted under conditions substantially similar to polymer which was not prestripped (Example B). In Examples A and B a short path evaporator was used to strip unreacted dichlorophenol (DCP) and other impurities from crude ester produced in a carbonylation reaction. The distillate from the evaporations of Examples A and B was compared.

The data in Table 1 show that substantially less distillate was collected from the stripped polymer, 15.3 wt. % (Example A) than the unstripped polymer, 21.2 wt. % (Example B).

TABLE 1

| | Evaporation Conditions | | | | |
|---|---|---|---|---|---|
| Feed | Feed rate Kg/Hr | Temp. °C. | Vacuum mm Hg | Distillate Wt. % | Residue Kg/Hr |
| Polymer Feed (Example 1) | 50 | 230 | 1.5 | 0.4 | 49.7 |

TABLE 1-continued

| | Evaporation Conditions | | | | |
|---|---|---|---|---|---|
| Feed | Feed rate Kg/Hr | Temp. °C. | Vacuum mm Hg | Distillate Wt. % | Residue Kg/Hr |
| Stripped Polymer (Example A) | 62 | 230 | 9.5 | 15.3 | 47.1 |
| Unstripped Polymer (Example B) | 56 | 230 | 9.3 | 21.2 | 41.4 |

From mass balances, the amount of light ester was calculated for each batch of crude ester. Then the mass of light ester was determined per kilogram of residue product (functionalized polymer). The $C_4$–$C_{20}$ light esters of Example A amounted to only about 0.03 kg (mostly $C_4$ and $C_5$ esters) in 8.1 kg total distillate whereas the $C_4$–$C_{24}$ light esters of Example B amounted to about 0.1 kg (mostly $C_4$–$C_6$ esters) of 11.1 kg total distillate, as determined by mass balance data. This near order of magnitude difference would have a dramatic economical effect on a commercial scale operation, requiring disposal and expensive handling of a much higher amount of light ester. The light ester otherwise rapidly builds up in and deteriorates the production process unless removed by more expensive means.

There is a threefold lesser level of light ester present in the product produced from the stripped polymer feed. Example A had only 0.79 grams light ester per kg functionalized polymer whereas Example B had 2.91 grams

TABLE 2

Molecular Weight Data by Gel Permeation Chromatography (GPC) for Functionalized Polymer Made From Stripped and Unstripped Polymer Feed (Examples A & B)

| | Temp. | $\bar{M}_n$ | $\frac{\bar{M}_w}{\bar{M}_n}$ | Weight Percent Polymer | | |
|---|---|---|---|---|---|---|
| | | | | <500(1) | <1,000(1) | >20,000(2) |
| Unstripped Polymer (Example B) | 235–240° C. | 3530 | 2.27 | 1.32 | 4.12 | 6.33 |
| Carbonylated Product After Short Path Strip at 10 mm Hg | 235–240° C. | 3415 | 2.35 | 1.5 | 4.81 | 6.63 |
| Carbonylated Product After Short Path Strip at 1 mm Hg | 235–240° C. | 3467 | 2.32 | 1.38 | 4.68 | 6.64 |
| Stripped Polymer (Example A) | 235–240° C. | 3647 | 2.19 | 1.03 | 3.86 | 6.26 |
| Carbonylated Product After Short Path Strip at 10 mm Hg | 235–240° C. | 3643 | 2.26 | 1.04 | 4.23 | |
| Carbonylated Product After Short Path Strip at 1 mm Hg | 235–240° C. | 3597 | 2.28 | 1.15 | 4.36 | 7.09 |

(1) weight percent of material less than stated molecular weight
(2) weight percent of material greater than stated molecular weight The data in Table 2 show that the carbonylated product after short path evaporation shows an improved quality when made from stripped polymer (Example A) when compared to product made from unstripped polymer (Example B). Product from Example A shows a directionally higher molecular weight ($\bar{M}_n$), a narrower molecular weight distribution ($\bar{M}_w/\bar{M}_n$) and a lower amount of polymer less than 500 and 1,000 molecular weight.

What is claimed is:

1. A process for improving a polymer prior to carbonylating the polymer in a Koch reaction, which comprises fractionating the polymer to remove a light hydrocarbon fraction.

2. The process of claim 1 wherein said fractionating comprises heating the polymer.

3. The process of claim 1 wherein said fractionating comprises distilling the polymer at a temperature of about 180° to 300° C. and under vacuum of about 1.0 to 30 mm Hg.

4. The process of claim 1 wherein said fractionating comprises stripping with an inert gas.

5. The process of claim 1 wherein said polymer is agitated.

6. The process of any of claims 1 to 3 wherein said process takes place in a short path evaporator.

7. A functionalized hydrocarbon polymer wherein the polymer backbone has $\bar{M}_n \geq 500$, functionalization is by attachment of groups of the formula —CO—Y—$R^3$ wherein Y is O or S, and $R^3$ is H, hydrocarbyl, substituted hydrocarbyl, aryl, or substituted aryl, and wherein at least 50 mole % of the functional groups are attached to a tertiary carbon atom of the polymer backbone, wherein the hydrocarbon polymer is fractionated to remove light hydrocarbon from said polymer prior to functionalization.

8. The polymer of claim 7 wherein said light hydrocarbon comprises $C_4$ to $C_{24}$ hydrocarbon.

9. The polymer of claim 7 wherein said light hydrocarbon comprises light polymer.

10. A functionalized hydrocarbon polymer wherein the polymer backbone has $\bar{M}_n \geq 500$, the polymer backbone prior to functionalization contains less than about 1 weight percent hydrocarbon of carbon number $C_{24}$ and below, functionalization is by attachment of groups of the formula —CO—Y—$R^3$ wherein Y is O or S, and $R^3$ is H, hydrocarbyl, substituted hydrocarbyl, aryl, or substituted aryl, and wherein at least 50 mole % of the functional groups are attached to a tertiary carbon atom of the polymer backbone.

* * * * *